(12) United States Patent
Fukushima

(10) Patent No.: US 10,695,957 B2
(45) Date of Patent: Jun. 30, 2020

(54) THREE-DIMENSIONAL IMAGE FORMING SYSTEM AND THREE-DIMENSIONAL STRUCTURE

(71) Applicant: CASIO COMPUTER CO., LTD., Shibuya-ku, Tokyo (JP)

(72) Inventor: Takayuki Fukushima, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 172 days.

(21) Appl. No.: 15/730,365

(22) Filed: Oct. 11, 2017

(65) Prior Publication Data

US 2018/0147755 A1    May 31, 2018

(30) Foreign Application Priority Data

Nov. 29, 2016 (JP) ................................ 2016-231786

(51) Int. Cl.
| | |
|---|---|
| B29C 35/08 | (2006.01) |
| B41J 2/205 | (2006.01) |
| B41J 3/407 | (2006.01) |
| H04N 1/407 | (2006.01) |
| B29C 44/04 | (2006.01) |
| B29C 44/02 | (2006.01) |
| B29L 31/00 | (2006.01) |

(52) U.S. Cl.
CPC ......... *B29C 35/0805* (2013.01); *B41J 2/2054* (2013.01); *B41J 3/407* (2013.01); *H04N 1/407* (2013.01); *B29C 44/022* (2013.01); *B29C 44/04* (2013.01); *B29L 2031/722* (2013.01)

(58) Field of Classification Search
None
See application file for complete search history.

(56) References Cited

U.S. PATENT DOCUMENTS

| | | |
|---|---|---|
| 8,870,327 B2 | 10/2014 | Kanamura et al. |
| 9,492,956 B2 | 11/2016 | Horiuchi |
| 2013/0278670 A1* | 10/2013 | Tanase ................... B41J 2/2132 347/19 |
| 2016/0167397 A1* | 6/2016 | Motoyanagi ........... B41J 3/4073 347/9 |

(Continued)

FOREIGN PATENT DOCUMENTS

| | | |
|---|---|---|
| JP | H08118780 A | 5/1996 |
| JP | H08258394 A | 10/1996 |

(Continued)

OTHER PUBLICATIONS

Japanese Office Action dated Feb. 26, 2019 (and English translation thereof) issued in counterpart Japanese Application No. 2016-231786.

*Primary Examiner* — Barbara D Reinier
(74) *Attorney, Agent, or Firm* — Holtz, Holtz & Volek PC

(57) ABSTRACT

A three-dimensional image forming system of the present invention is characterized to include a density adjustment unit configured to adjust, for print data for printing a grayscale image used to cause a predetermined region of a thermally expandable sheet to thermally expand, density of the grayscale image according to types of pattern images included in the grayscale image, in print regions of the pattern images such that expansion heights of the print regions of the pattern images become desired heights.

10 Claims, 12 Drawing Sheets

(56) References Cited

U.S. PATENT DOCUMENTS

2019/0283285 A1* 9/2019 Motoyanagi ............ B41M 5/395

FOREIGN PATENT DOCUMENTS

| JP | 2001-150812 | * | 6/2001 |
| JP | 2001150812 A | | 6/2001 |
| JP | 2012171317 A | | 9/2012 |
| JP | 5672289 B2 | | 2/2015 |

* cited by examiner

| | |
|---|---|
| SHEET X SIZE | 26a |
| SHEET Y SIZE | 26b |
| X START POSITION | 26c |
| Y START POSITION | 26d |
| X SIXE | 26e |
| Y SIZE | 26f |
| CLOSED CURVE ATTRIBUTE | 26g |
| PATTERN TYPE NUMBER | 26h |
| EXPANSION HEIGHT (FOAMING HEIGHT) | 26i |
| LINE TYPE | 26j |
| LINE WIDTH | 26k |
| COLOR | 26l |
| VECTOR DATA | 26m |

| PATTERN TYPE NUMBER | EXPANSION HEIGHT (FOAMING HEIGHT) | SIZE | DENSITY |
|---|---|---|---|
| PT001 | 25% | 1cm² | K15 |
| | | 2cm² | K15 |
| | | ⋮ | ⋮ |
| | 50% | 1cm² | K35 |
| | | 2cm² | K35 |
| | | ⋮ | ⋮ |
| | 75% | 1cm² | K60 |
| | | 2cm² | K55 |
| | | ⋮ | ⋮ |
| | 100% | 1cm² | K80 |
| | | 2cm² | K75 |
| | | ⋮ | ⋮ |

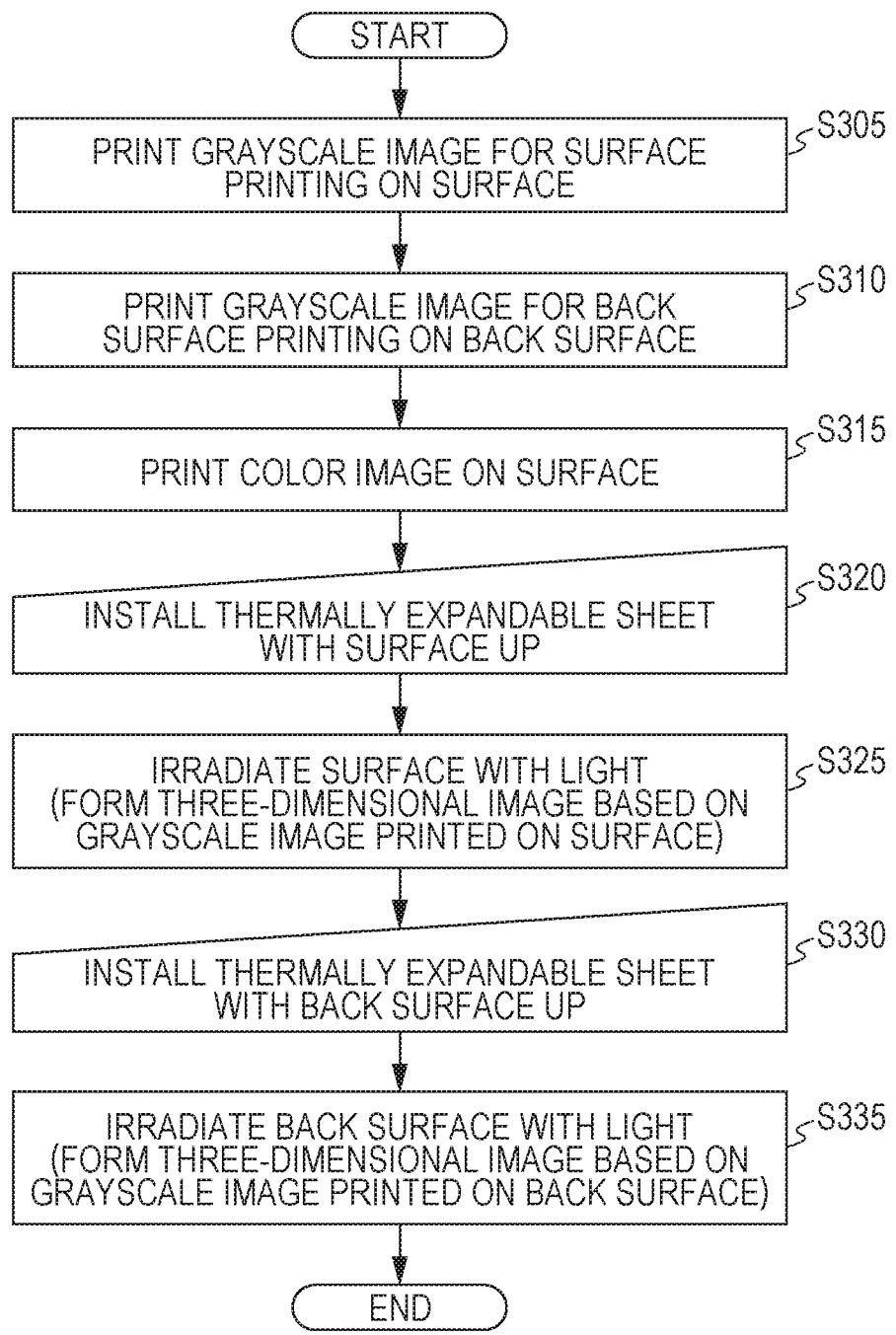

THREE-DIMENSIONAL IMAGE FORMING SYSTEM AND THREE-DIMENSIONAL STRUCTURE

CROSS-REFERENCE TO RELATED APPLICATIONS

This application is based upon and claims the benefit of priority from the prior Japanese Patent Application No. 2016-231786, filed on Nov. 29, 2016, the entire contents of which are incorporated herein by reference.

BACKGROUND OF THE INVENTION

1. Field of the Invention

The present invention relates to a three-dimensional image forming system and a three-dimensional structure.

2. Description of the Related Art

Conventionally, a medium called thermally expandable sheet (or foamable sheet) is known. The thermally expandable sheet includes an expansion layer that expands (foams) according to an absorbed heat quantity inside the sheet. Further, a three-dimensional image forming system is known (JP 2001-150812 A). The three-dimensional image forming system causes a thermally expandable sheet to partially expand to form a three-dimensional image on the thermally expandable sheet.

The three-dimensional image forming system includes a print data creation device (computer), a printer, and a light irradiation unit. The print data creation device is a device that creates print data (print image data) of a grayscale image for forming a three-dimensional image. The printer is a device that prints the grayscale image including carbon black on the thermally expandable sheet on the basis of the print data created in the data creation device. The light irradiation unit is a unit that irradiates the thermally expandable sheet, on which the grayscale image has been printed, with electromagnetic waves. The grayscale image printed on the thermally expandable sheet includes carbon black, and functions as an electromagnetic wave thermal conversion layer that converts the electromagnetic waves into heat. The three-dimensional image forming system causes the light irradiation unit to irradiate the thermally expandable sheet with visible light and near infrared light (electromagnetic waves). Then, the grayscale image printed on the thermally expandable sheet converts the near infrared light (electromagnetic waves) into heat. An expansion layer in a print region where the grayscale image is printed expands and rises according to the heat, inside the thermally expandable sheet. With the process, the three-dimensional image forming system forms the three-dimensional image on the thermally expandable sheet.

SUMMARY OF THE INVENTION

A three-dimensional image forming system of the present invention is characterized to include a density adjustment unit configured to adjust, for print data for printing a grayscale image used to cause a predetermined region of a thermally expandable sheet to thermally expand, density of the grayscale image according to types of pattern images included in the grayscale image, in print regions of the pattern images such that expansion heights of the print regions of the pattern images become desired heights.

A three-dimensional image forming system of the present invention is characterized to include a sorting unit configured to sort, for print data for printing a grayscale image used to cause a predetermined region of a thermally expandable sheet to thermally expand, pattern images included in the grayscale image into a pattern image to be printed on a surface of the thermally expandable sheet and a pattern image to be printed on a back surface of the thermally expandable sheet on the basis of types of the pattern images for each pattern image.

A three-dimensional structure of the present invention is characterized in that a grayscale image used to cause a desired region of a thermally expandable sheet to thermally expand is printed, a three-dimensional image is formed in a print region where the grayscale image is printed, and a plurality of types of pattern images is included in the grayscale image, and even between print regions where expansion heights of the three-dimensional images are the same, density of the grayscale image differs according to the types of the pattern images.

BRIEF DESCRIPTION OF THE DRAWINGS

FIG. 9 is a diagram illustrating an example of adjustment value data;

FIG. 12 is a flowchart illustrating an operation of a three-dimensional image forming system according to an embodiment.

DETAILED DESCRIPTION OF THE PREFERRED EMBODIMENTS

Figure 1:
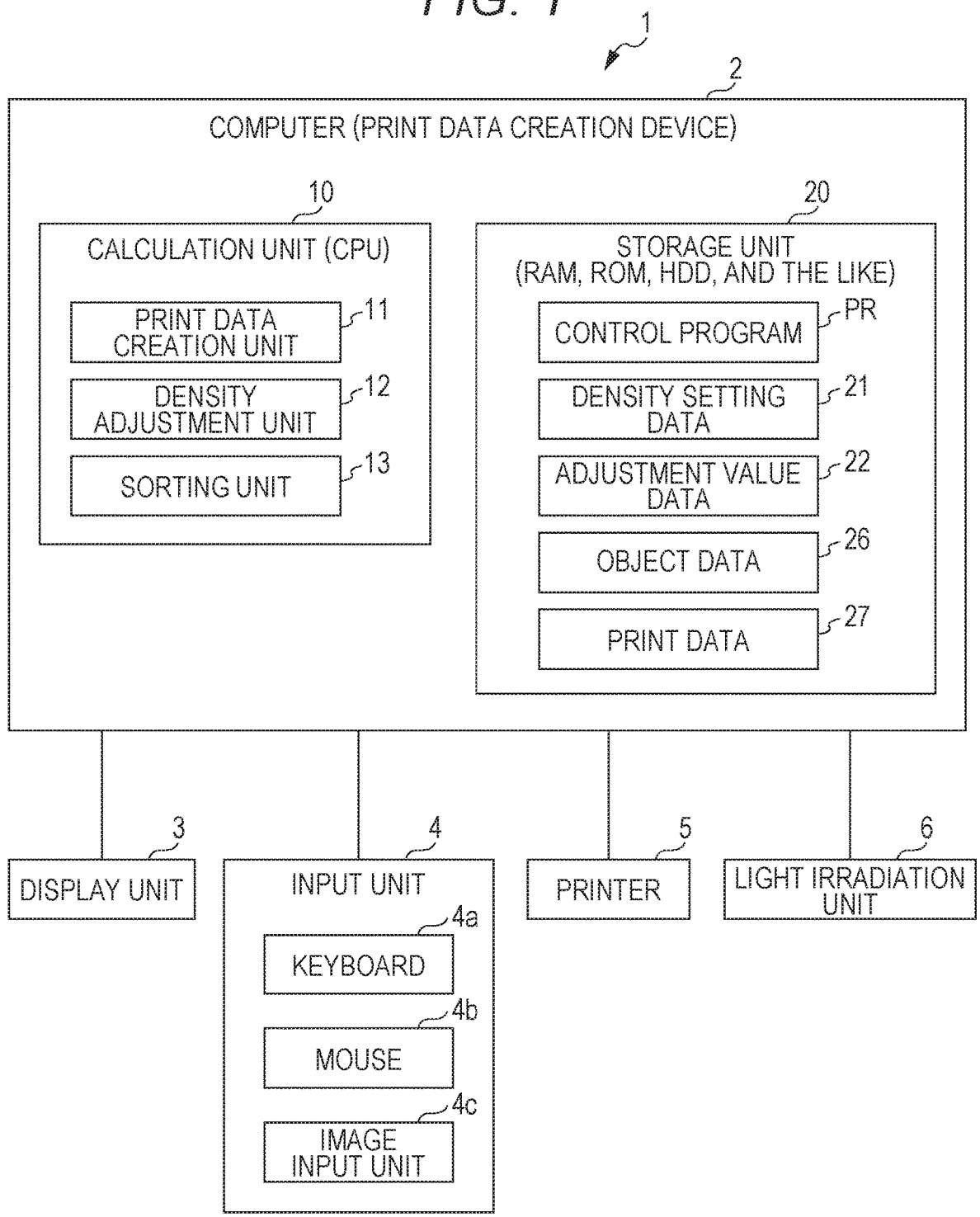
FIG. 1 is a diagram illustrating a configuration of a three-dimensional image forming system according to an embodiment.

Hereinafter, embodiments of the present invention (hereinafter, referred to as "present embodiment") will be described with reference to the drawings. Note that the drawings are merely schematic illustration to the extent that the present invention can be sufficiently understood. Therefore, the present invention is not limited to the illustrated examples. Further, in the drawings, a common configuration element or a similar configuration element is denoted with the same reference sign, and overlapping description thereof is omitted.

<Configuration of Three-dimensional Image Forming System>

Hereinafter, a configuration of a three-dimensional image forming system according to the present embodiment will be described with reference to FIG. 1. FIG. 1 is a diagram illustrating a configuration of a three-dimensional image forming system 1 according to the present embodiment. The three-dimensional image forming system 1 is a system that forms a three-dimensional image in a predetermined region of a sheet called thermally expandable sheet (foamable sheet). The thermally expandable sheet is a sheet including an expansion layer that expands according to an absorbed heat quantity inside the sheet.

As illustrated in FIG. 1, the three-dimensional image forming system 1 according to the present embodiment includes a computer 2, a display unit 3, an input unit 4, a printer 5, and a light irradiation unit 6.

The computer 2 includes a calculation unit 10 and a storage unit 20, and controls the input unit 4, the printer 5, and the light irradiation unit 6. The calculation unit 10 is configured from a central processing unit (CPU). The storage unit 20 is configured from a random access memory (RAM), a read only memory (ROM), a hard disk drive (HDD), and the like.

In the present embodiment, the computer 2 functions as the following three devices:

(1) A print data creation device that creates print data (print image data) of a grayscale image.

(2) A print instruction device that operates the printer 5 to print the grayscale image on the thermally expandable sheet.

(3) A unit instruction device that operates the light irradiation unit 6 to form the three-dimensional image on the thermally expandable sheet.

The computer 2 includes, in a calculation unit 10, a print data creation unit 11 that creates print data of a grayscale image, a density adjustment unit 12 that adjust density of the grayscale image, and a sorting unit 13 that sorts the grayscale image into an image to be printed on a surface of the thermally expandable sheet and an image to be printed on a back surface.

The print data creation unit 11 acquires object data 26 described below from an outside through the input unit 4, and creates print data 27 of the grayscale image on the basis of the acquired object data 26, density setting data 21 stored in the storage unit 20 in advance, and adjustment value data 22. Here, "object" means an image to be printed that is used to form a three-dimensional image on a thermally expandable sheet. Further, the "object data 26" means image data to be printed.

The density adjustment unit 12 adjusts, for the print data 27 created in the print data creation unit 11, the density of the grayscale image according to types of pattern images in print regions of the pattern images such that expansion heights of the print regions of the pattern images included in the grayscale image become desired heights (to be specific, a height specified by a user for each pattern image).

The sorting unit 13 sorts the grayscale image into an image to be printed on a surface of the thermally expandable sheet and an image to be printed on a back surface according to a type of each pattern image included in the grayscale image.

The storage unit 20 stores a control program PR, the density setting data 21, and the adjustment value data 22 in advance. The control program PR is a program that defines an operation of the print data creation unit 11. The density setting data 21 is data for setting initial value density of the grayscale image. The adjustment value data 22 is data for setting adjustment value density of the grayscale image. Here, the "adjustment value density of the grayscale image" means density to be referred in adjusting the set initial value density of the grayscale image on the basis of the density setting data 21.

Further, the storage unit 20 stores the object data 26 and the print data 27 of the grayscale image.

The display unit 3 is configured from a liquid crystal display panel, for example.

The input unit 4 is configured from a keyboard 4a, a mouse 4b, an image input unit 4c, and the like. The image input unit 4c is a device for inputting the object data 26 to the computer 2. The image input unit 4c is configured from a card reader and a drive device that read data from a card-like storage medium and a disk-like storage medium, a scanner device that optically reads an image on a printed matter, a communication device that communicated with another device, and the like.

The printer 5 is configured from an inkjet printer, for example. The printer 5 prints, as the electromagnetic wave thermal conversion layer, the grayscale image with carbon black on one or both of the surfaces and the back surface of the thermally expandable sheet.

The light irradiation unit 6 is a unit that irradiates the thermally expandable sheet with visible light and near infrared light while conveying the thermally expandable sheet. The thermally expandable sheet is a medium including an expansion layer that expands according to an absorbed heat quantity inside the sheet. When the print region where the grayscale image is printed, of the thermally expandable sheet, is irradiated with the visible light and the near infrared light from the light irradiation unit 6, the near infrared light is converted into heat in the print region, and heat is generated. In response to the heat generation, the expansion layer of the print region expands and rises. As a result, the three-dimensional image is formed.

<Relationship Between Object Data and Print Data>

Figure 2:
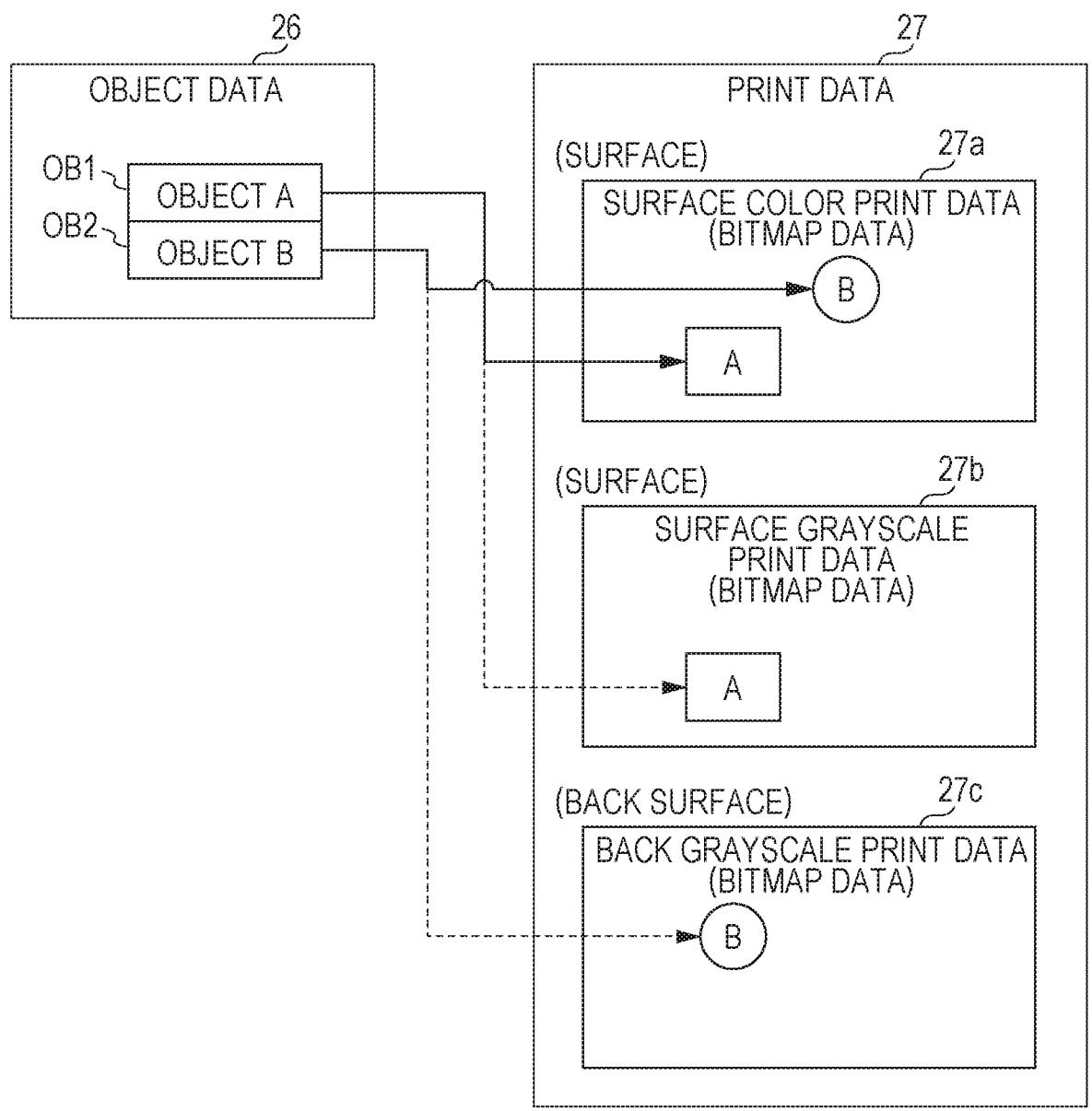
FIG. 2 is a diagram illustrating a relationship between object data and print data.

Hereinafter, a relationship between the object data and the print data will be described with reference to FIG. 2. FIG. 2 is a diagram illustrating a relationship between the object data 26 and the print data 27.

In the example illustrated in FIG. 2, the object data 26 includes object data OB1 corresponding to an object A and object data OB2 corresponding to an object B. The computer 2 creates the print data 27 on the basis of the object data 26 when functioning as the print data creation device.

In the example illustrated in FIG. 2, the computer 2 creates surface color print data 27a and surface grayscale print data 27b corresponding to the object A from the object data OB1. Further, the computer 2 creates the surface color print data 27a and back grayscale print data 27c corresponding to the object B from the object data OB2.

The surface color print data 27a is bitmap data indicating a color image to be printed on the surface of the thermally expandable sheet.

The surface grayscale print data 27b is bitmap data indicating a grayscale image with carbon black to be printed on the surface of the thermally expandable sheet.

The back grayscale print data 27c is bitmap data indicating a grayscale image with carbon black to be printed on the back surface of the thermally expandable sheet. Note that the grayscale image (back-side grayscale image) printed on the back surface of the thermally expandable sheet is printed on the back surface of the thermally expandable sheet so as to have a mirror-inverted configuration as viewed from the surface side of the thermally expandable sheet.

The three-dimensional image forming system 1 forms the three-dimensional image as follows using the aforementioned data. At the time of formation of the three-dimensional image, first, the computer 2 of the three-dimensional image forming system 1 functions as the print instruction device to operate the printer 5. At this time, the computer 2 causes the printer 5 to print the color image and the grayscale image of the object A and the color image of the object B on the surface of the thermally expandable sheet, and the grayscale image of the object B on the back surface of the thermally expandable sheet, on the basis of the created print data 27.

In the case, where the color image and the grayscale image are printed on the same plane (in the illustrated example, the surface), the grayscale image is printed first and then the color image is printed on the grayscale image. The color image and the grayscale image can be images having different patterns.

After that, the thermally expandable sheet is set to the light irradiation unit 6. The computer 2 then functions as the unit instruction device to operate the light irradiation unit 6. At this time, the computer 2 causes the light irradiation unit 6 to irradiates the thermally expandable sheet with visible light and near infrared light (electromagnetic waves). The irradiation is performed on the surface of the thermally expandable sheet and then performed on the back surface of the thermally expandable sheet. The grayscale image printed on the thermally expandable sheet converts the radiated near infrared light (electromagnetic waves) into heat. With the process, the expansion layer in the print region where the grayscale image is printed expands (foams) inside the thermally expandable sheet. As a result, the three-dimensional image is formed on the thermally expandable sheet.

Figure 3A:
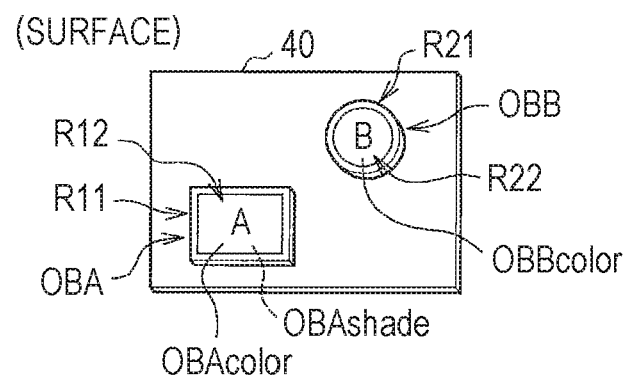
FIGS. 3A and 3B are diagrams illustrating examples of three-dimensional images, color images, and grayscale images.
Figure 3B:
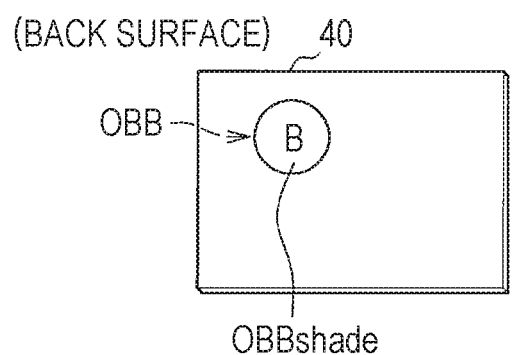

FIGS. 3A and 3B are diagrams illustrating examples of three-dimensional images, color images, and grayscale images. FIG. 3A illustrates a configuration example of the thermally expandable sheet 40 on the surface side, and FIG. 3B illustrates a configuration example of the thermally expandable sheet 40 on the back surface side.

In the example illustrated in FIG. 3A, a three-dimensional image OBA of the object A is formed on the surface of the thermally expandable sheet 40. A color image OBAcolor of the object A is printed on a surface of the three-dimensional image OBA, and a grayscale image OBAshade of the object A is printed under the color image OBAcolor.

Further, in the example illustrated in FIG. 3A, a three-dimensional image OBB of the object B is formed on the surface of the thermally expandable sheet 40. A color image OBBcolor of the object B is printed on a surface of the three-dimensional image OBB. Then, as illustrated in FIG. 3B, the grayscale image OBBshade of the object B is printed on the back surface of the thermally expandable sheet 40 at a position on a back side of a forming region where the three-dimensional image OBB is formed. The grayscale image OBBshade of the object B has a mirror inverted configuration with respect to the three-dimensional image OBB of the object B.

In the examples illustrated in FIGS. 3A and 3B, the three-dimensional image OBA of the object A exhibits a square shape, and includes a closed curve line R11 and a pattern image R12 arranged inside the closed curve line R11. Further, the three-dimensional image OBB of the object B exhibits a circular shape, and includes a closed curve line R21 and a pattern image R22 arranged inside the closed curve line R21. Note that the examples illustrated in FIGS. 3A and 3B are mere examples. A user can arbitrarily create three-dimensional images having various shapes according to the operation.

As the closed curve lines R11 and R21, ones specified by the user from among a plurality of types of line images prepared in advance. Examples of the plurality of types of line images prepared in advance include a solid line, a dotted line, a broken line, and a one-dot chain line. Therefore, the user can specify not only the solid line but also a partially disconnected line image such as the one-dot chain line, as the closed curve lines R11 and R21. Further, the user can specify the thickness of the closed curve lines R11 and R21.

As the pattern images R12 and R22, ones specified by the user from among a plurality of types of pattern images prepared in advance. FIGS. 4A to 4C and FIGS. 5A to 5C illustrate examples of the plurality of types of pattern images prepared in advance. Note that the examples of the pattern images illustrated in FIGS. 4A to 4C and FIGS. 5A to 5C are mere examples. The user can arbitrarily prepare various pattern images in advance according to the operation.

<Examples of Pattern Images>

Hereinafter, examples of the pattern images will be described with reference to FIGS. 4A to 4C and FIGS. 5A to 5C. FIGS. 4A to 4C and FIGS. 5A to 5C are diagrams illustrating examples of pattern images.

Figure 4A:
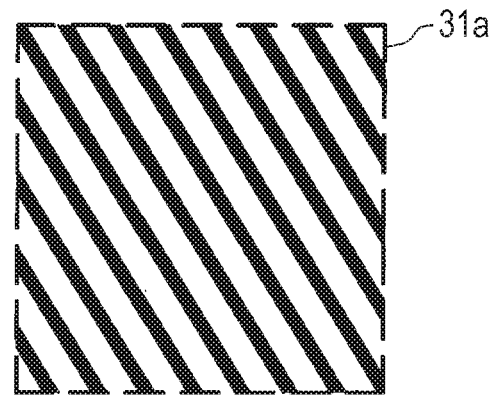
FIGS. 4A, 4B, and 4C are diagrams illustrating examples of pattern images.
Figure 4B:
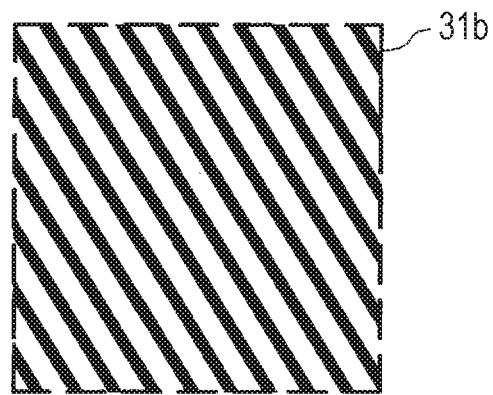
Figure 4C:
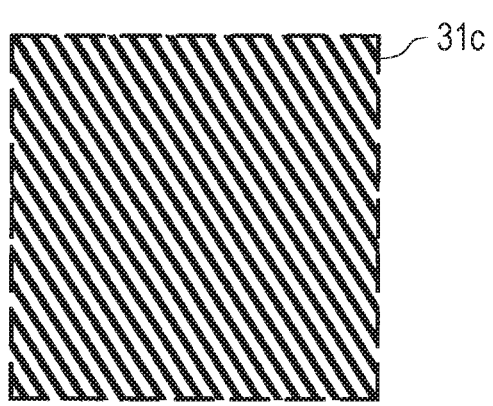

FIGS. 4A to 4C illustrate examples of three types of pattern images 31a, 31b and 31c. As illustrated in FIGS. 4A to 4C, the pattern images 31a, 31b, and 31c respectively have configurations in which a plurality of diagonal lines from top left to bottom right are drawn. The pattern image 31a in FIG. 4A has a configuration in which the line width of the diagonal line is the thickest and the number of the diagonal lines is the smallest. Further, the pattern image 31b in FIG. 4B has a configuration in which the line width of the diagonal line is the second thickest and the number of the diagonal lines is the second largest. Further, the pattern image 31c in FIG. 4C has a configuration in which the line width of the diagonal line is the narrowest and the number of the diagonal lines is the largest.

Figure 5A:
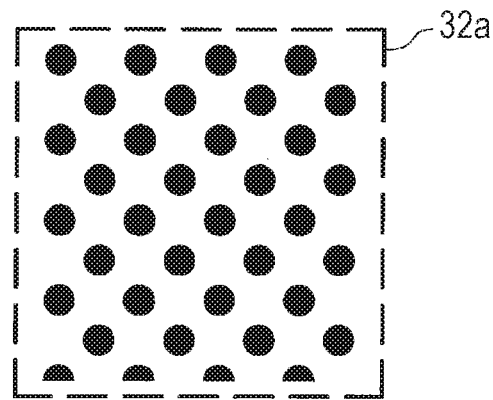
FIGS. 5A, 5B, and 5C are diagrams illustrating examples of pattern images.
Figure 5B:
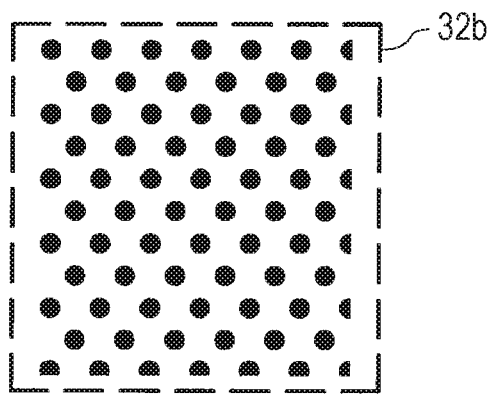
Figure 5C:
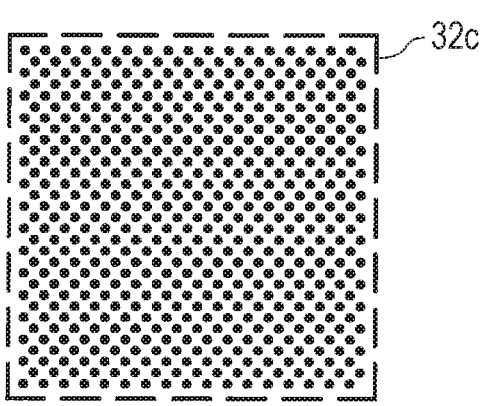

FIGS. 5A to 5C illustrate examples of three types of pattern images 32a, 32b and 32c. As illustrated in FIGS. 5A to 5C, the pattern images 32a, 32b, and 32c respectively have configurations in which a plurality of circles are drawn. The pattern image 32a in FIG. 5A has a configuration in which the size of the circle is the largest and the number of the circles is the smallest. The pattern image 32b in FIG. 5B has a configuration in which the size of the circle is the second largest and the number of the circles is the second largest. Further, the pattern image 32c in FIG. 5C has a configuration in which the size of the circle is the smallest and the number of the circles is the largest.

The object data 26 has a configuration including such closed curve lines and pattern images.

<Configuration of Three-Dimensional Image>

Figure 6A:
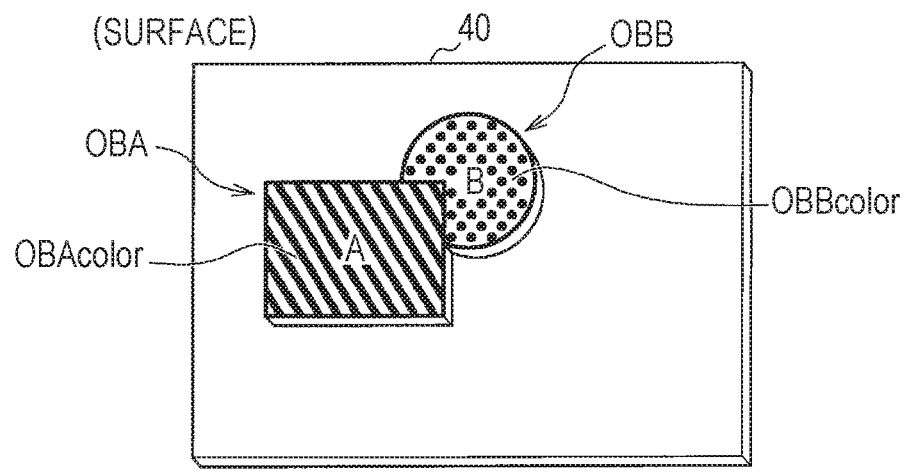
FIGS. 6A, 6B, and 6C are diagrams illustrating configurations of three-dimensional images.
Figure 6B:
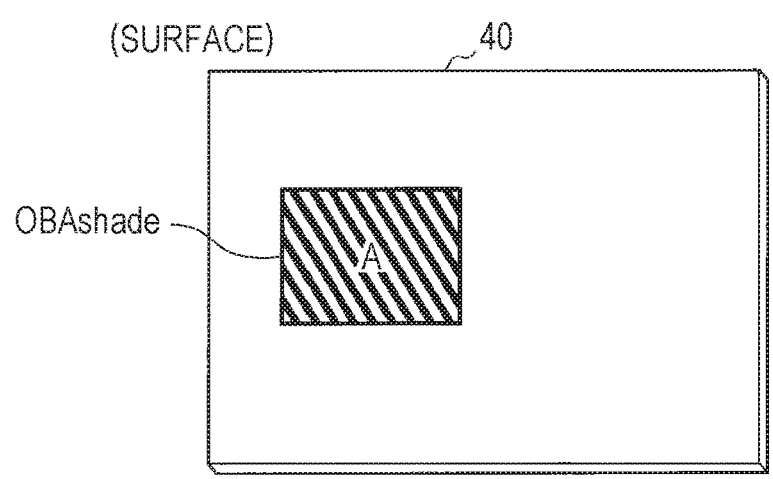
Figure 6C:
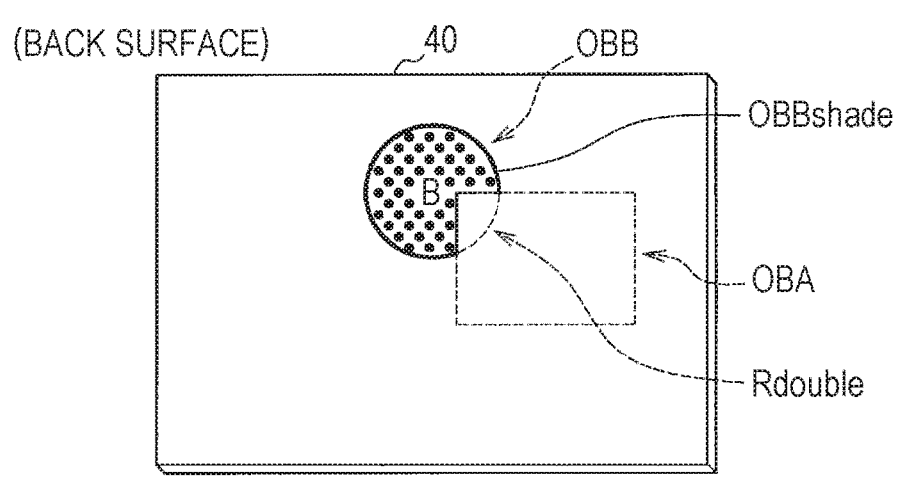

Hereinafter, configurations of three-dimensional images will be described with reference to FIGS. 6A to 6C. FIGS. 6A to 6C are diagrams illustrating configurations of the three-dimensional images. FIG. 6A illustrates the three-dimensional images OBA and OBB of the two objects A and B formed on the thermally expandable sheet 40. FIG. 6B illustrates the shape of the grayscale image OBAshade of the object A printed on the surface of the thermally expandable sheet 40. FIG. 6C illustrates the shape of the grayscale image OBBshade of the object B printed on the back surface of the thermally expandable sheet 40.

In the example illustrated in FIG. 6A, the three-dimensional image OBA of the object A having a square shape and the three-dimensional image OBB of the object B having a circular shape are formed on the thermally expandable sheet 40. The color image OBAcolor of the object A is printed on the surface of the three-dimensional image OBA of the object A. Further, the color image OBBcolor of the object B is printed on the surface of the three-dimensional image OBB of the object B. The three-dimensional image OBA of the object A and the three-dimensional image OBB of the object B partially overlap with each other. Hereinafter, a region where two or more three-dimensional images overlap with one another is referred to as "joined region Rdouble (see FIG. 6C)".

As illustrated in FIG. 6B, the grayscale image OBAshade of the object A is printed on the surface of the thermally expandable sheet 40. Meanwhile, as illustrated in FIG. 6C, the grayscale image OBBshade of the object B is printed on the back surface of the thermally expandable sheet 40. The grayscale image OBBshade of the object B has a partially erased shape in the joined region Rdouble. The grayscale image OBBshade of the object B has a mirror inverted configuration with respect to the three-dimensional image OBB of the object B.

In the present embodiment, the grayscale image OBBshade of the object B printed on the back surface of the thermally expandable sheet 40 is partially erased in the joined region Rdouble. However, on the other hand, the grayscale image OBAshade (see FIG. 6B) of the object A printed on the surface of the thermally expandable sheet 40 may be partially erased without erasing the grayscale image OBBshade of the object B in the joined region Rdouble depending on the operation.

<Process of Forming Three-Dimensional Image>

Hereinafter, a process of forming a three-dimensional image will be described with reference to FIGS. 7A to 7C. Here, description will be given assuming a case of forming the three-dimensional image OBA of the object A and the three-dimensional image OBB of the object B illustrated in FIGS. 6A to 6C.

Figure 7A:
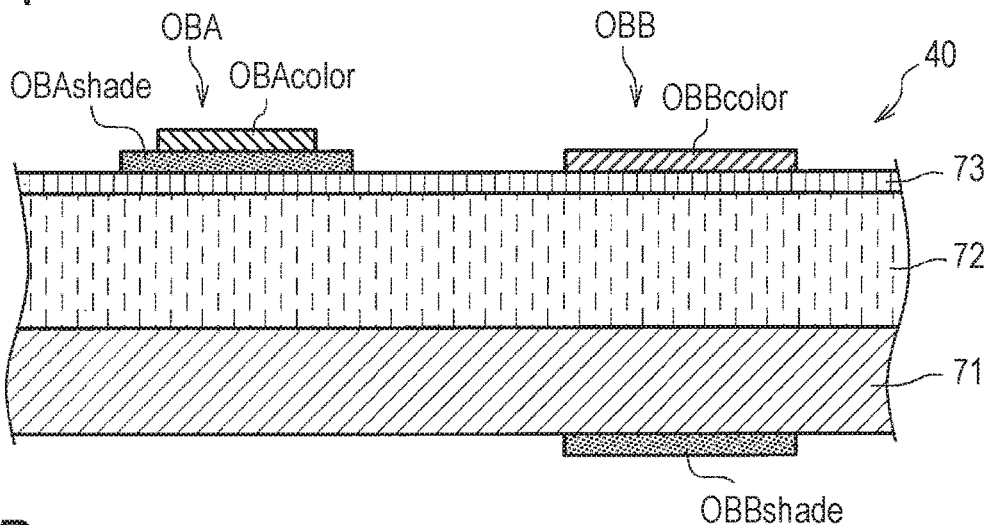
FIGS. 7A, 7B, and 7C are diagrams illustrating a process of forming three-dimensional images.
Figure 7B:
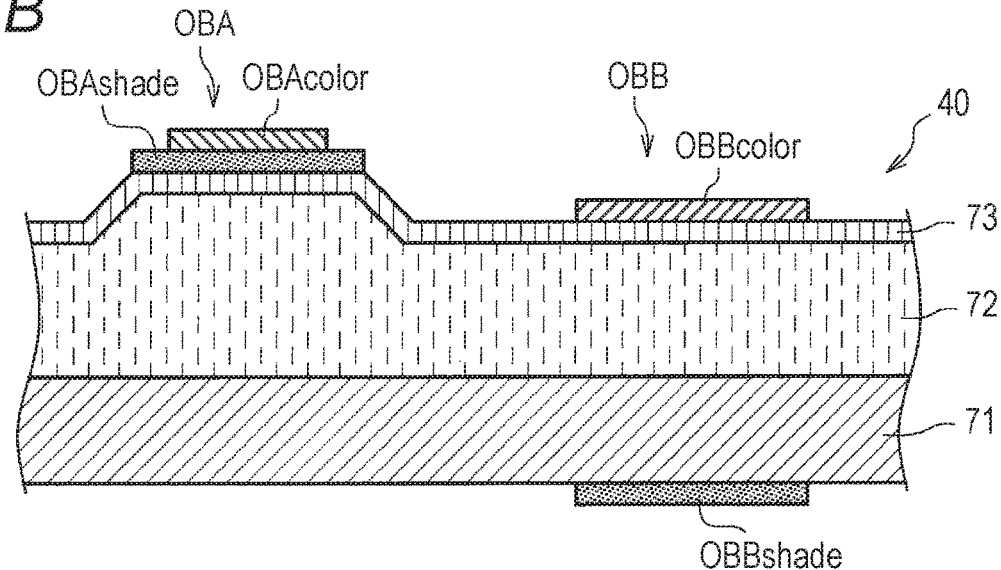
Figure 7C:
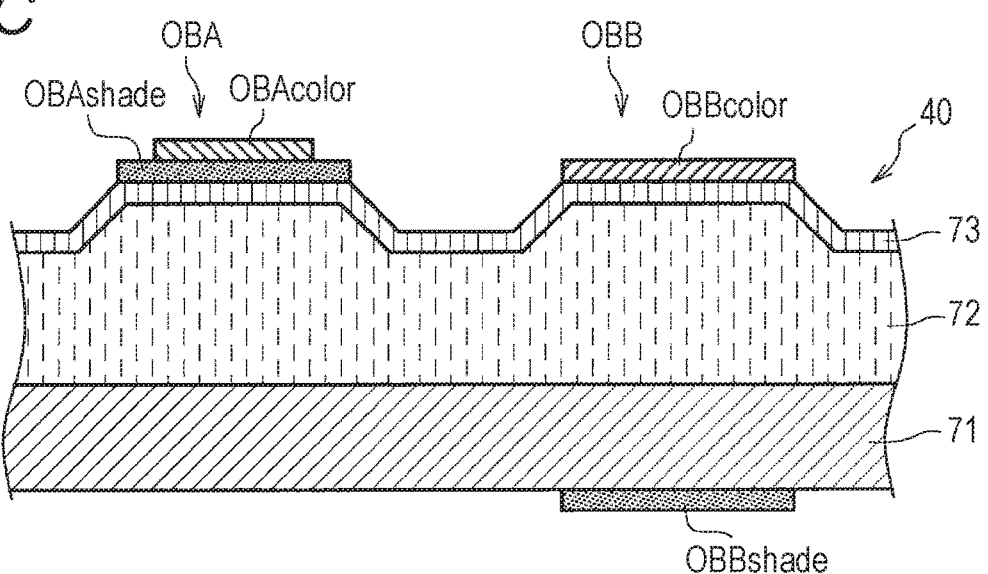

FIGS. 7A to 7C are diagrams illustrating a process of forming three-dimensional images. FIG. 7A illustrates a sectional shape of the thermally expandable sheet 40 before heated (before irradiated with light). FIG. 7B illustrates a sectional shape of the thermally expandable sheet 40 after the surface is heated (after the surface is irradiated with light). FIG. 7C illustrates a sectional shape of the thermally expandable sheet 40 after the back surface is heated (after the back surface is irradiated with light).

As illustrated in FIG. 7A, the thermally expandable sheet 40 has a base material 71, an expansion layer (resin foam layer) 72, and an ink receiving layer 73 laminated in order.

The base material 71 is made of fabric such as paper or a canvas sheet, a panel material made of plastic, and the like, and the material is not especially limited.

The expansion layer (resin foam layer) 72 has thermally expandable microcapsules (thermally foaming agent) dispersed and arranged in a binder as a thermoplastic resin provided on the base material 71. With the configuration, the expansion layer (resin foam layer) 72 foams and expands according to an absorbed heat quantity.

The ink receiving layer 73 is formed to have a thickness of 10 μm to cover the entire upper surface of the expansion layer (resin foam layer) 72. The ink receiving layer 73 is configured from a material that is favorable for receiving an ink for print used in an inkjet printer, a toner for print used in a laser printer, a ball-point pen or an ink of a fountain pen, graphite of a pencil, or the like, and fixing the received ink or the like on the surface.

In the example illustrated in FIG. 7A, the grayscale image OBAshade of the object A is printed on a part of the surface (the ink receiving layer 73 side) of the thermally expandable sheet 40 with an ink containing carbon black, and the color image OBAcolor of the object A is printed on a part of the grayscale image OBAshade with a color ink such as cyan, magenta, yellow, and the like. Further, the grayscale image OBB shade of the object B is printed on a part of the back surface (the base material 71 side) of the thermally expandable sheet 40 with an ink containing carbon black. Since FIG. 7A illustrates a state before heated (before irradiated with light), the thickness of the expansion layer (resin foam layer) 72 in the thermally expandable sheet 40 is uniform.

The grayscale images OBAshade and OBBshade are images for forming three-dimensional patterns. The grayscale images OBAshade and OBBshade include carbon black, and functions as an electromagnetic wave thermal conversion layer that converts electromagnetic waves into heat.

The thermally expandable sheet 40 is set to the light irradiation unit 6 (see FIG. 1) and irradiated with the visible light and the near infrared light (electromagnetic waves) on the surface. Then, the grayscale image OBAshade of the object A printed on the thermally expandable sheet 40 converts the near infrared light (electromagnetic waves) into heat. The expansion layer (resin foam layer) 72 in the print region where the grayscale image OBAshade of the object A is printed expands and rises according to the heat inside the thermally expandable sheet 40 (see FIG. 7B).

As illustrated in FIG. 7B, the ink receiving layer 73, the grayscale image OBAshade, and the color image OBAcolor have elastic properties and are deformed following the expansion of the expansion layer (resin foam layer) 72. Therefore, the three-dimensional image OBA of the object A is formed.

After that, the thermally expandable sheet 40 is set to the light irradiation unit 6 (see FIG. 1) after the surface and the back surface are inverted, and the back surface is irradiated with the visible light and the near infrared light (electromagnetic waves). Then, the grayscale image OBBshade of the object B printed on the thermally expandable sheet 40 converts the near infrared light (electromagnetic waves) into heat. The expansion layer (resin foam layer) 72 in the print region where the grayscale image OBB shade of the object B is printed expands and rises according to the heat inside the thermally expandable sheet 40 (see FIG. 7C).

As illustrated in FIG. 7C, the ink receiving layer 73 and the color image OBBcolor have elastic properties and are deformed following the expansion of the expansion layer (resin foam layer) 72. Therefore, the three-dimensional image OBB of the object B is formed.

<Configuration of Object Data>

Figures 8A, 8B:
FIGS. 8A and 8B are diagrams illustrating an example of object data.

Hereinafter, a configuration of the object data 26 will be described with reference to FIGS. 8A and 8B. FIGS. 8A and 8B are diagrams illustrating an example of the object data 26. FIG. 8A illustrates an example of a configuration of the object data 26 and FIG. 8B illustrates an example of an object OB3 defined by the object data 26.

In the example illustrated in FIG. 8A, the object data 26 includes sheet X size data 26a, sheet Y size data 26b, X start position data 26c, Y start position data 26d, X size data 26e, Y size data 26f, closed curve attribute data 26g, pattern type number data 26h, expansion height (foaming height) data 26i, line type data 26j, line width data 26k, color data 26l, and vector data 26m.

The sheet X size data 26a is data indicating a size of the thermally expandable sheet 40 (sheet) in an X direction.

The sheet Y size data 26b is data indicating a size of the thermally expandable sheet 40 (sheet) in a Y direction.

The X start position data 26c is data indicating a position where print of an object in the X direction is started.

The Y start position data 26d is data indicating a position where print of an object in the Y direction is started.

The X size data 26e is data indicating a size of the object in the X direction.

The Y size data 26f is data indicating a size of the object in the Y direction.

The closed curve attribute data 26g is data indicating an attribute of a closed curve.

The pattern type number data 26h is number data indicating a type of a pattern image.

The expansion height (foaming height) data 26i is data indicating an expansion height (foaming height) of the pattern image. The expansion height (foaming height) data 26i is specified by the user in advance. The line type data 26j is data indicating a line type of the closed curve such as a solid line, a dotted line, a broken line, or a one-dot chain line.

The line width data 26k is data indicating a line width of the closed curve.

The color data 26l is data indicating a color of an object to be printed.

The vector data 26m is data indicating a direction of a line.

The sheet X size data 26a, the sheet Y size data 26b, the X start position data 26c, the Y start position data 26d, the X size data 26e, the Y size data 26f, the closed curve attribute data 26g, the pattern type number data 26h, the line type data 26j, the line width data 26k, and the vector data 26m are reflected on the surface color print data 27a, the surface grayscale print data 27b, and the back grayscale print data 27c (see FIG. 2). That is, the surface color print data 27a, the surface grayscale print data 27b, and the back grayscale print data 27c are created to include the aforementioned data.

Further, the expansion height (foaming height) data 26i is reflected on the surface grayscale print data 27b and the back grayscale print data 27c (see FIG. 2).

Further, the color data 26l is reflected on the surface color print data 27a (see FIG. 2).

The object data 26 can define objects having various shapes such as the object OB3 illustrated in FIG. 8B as an example.

The three-dimensional image forming system 1 receives an instruction of print of the images (the grayscale images and the color images) from the user and prints the grayscale images and the color images on the thermally expandable sheet 40 by the printer 5 (see FIG. 1). At this time, the three-dimensional image forming system 1 creates the surface grayscale print data 27b and the back grayscale print data 27c (see FIG. 2) on the basis of the object data 26 and the density setting data 21 (see FIG. 1). Further, the three-dimensional image forming system 1 creates the surface color print data 27a (see FIG. 2) on the basis of the color data 26l of the object data 26. The three-dimensional image forming system 1 then prints the grayscale images on the surface and the back surface of the thermally expandable sheet 40 on the basis of the surface grayscale print data 27b and the back grayscale print data 27c. Further, the three-dimensional image forming system 1 prints the color images on the surface of the thermally expandable sheet 40 on the basis of the surface color print data 27a.

By the way, the grayscale image has differences in a heat radiation quantity and a heat storage quantity due to a difference in the type of the pattern image in the print regions of the pattern images. Therefore, variation in the expansion height occurs due to the difference in the type of the pattern image in the print regions of the pattern images, when the grayscale image is directly printed on the basis of the surface grayscale print data 27b and the back grayscale print data 27c without adjusting the density.

Therefore, the three-dimensional image forming system 1 according to the present embodiment prints the grayscale image after adjusting the density of the grayscale image on the basis of an adjustment value defined in advance in the adjustment value data 22 (see FIG. 1) according to the type of the pattern image in the print regions of the pattern images, rather than directly printing the grayscale image on the basis of the surface grayscale print data 27b and the back grayscale print data 27c.

The "adjustment value" can be obtained in advance by preparing in advance, for each pattern image, a plurality of sample sheets on which carbon black of arbitrary density is printed along the pattern image, causing the sample sheets to expand in an experiment, and verifying the density of the carbon black on the sample sheet that expands by a desired height.

Note that the variation in the expansion height also occurs due to overexpansion (a phenomenon in which expansion advances exceeding a desired height) due to an excess heat quantity as a result of a phenomenon in which pixel density of the grayscale image becomes too high in the joined region Rdouble (see FIG. 6C) when duplex printing is performed on both surfaces of the thermally expandable sheet 40, for example. Therefore, to eliminate the variation in the expansion height in the joined region Rdouble (see FIG. 6C), the three-dimensional image forming system 1 favorably treats the joined region Rdouble as a mask region, synthesizes mask data in which the density is zero, with the mask region of bitmap data indicating the grayscale image to be printed on the surface or the back surface of the thermally expandable sheet 40, and prints the grayscale image on the basis of the bitmap data. In the present embodiment, description will be given assuming that the three-dimensional image forming system 1 has a configuration to perform the aforementioned processing (hereinafter, referred to as "mask support processing").

<Configuration of Adjustment Value Data>

Hereinafter, a configuration of the adjustment value data 22 will be described with reference to FIG. 9. FIG. 9 is a diagram illustrating an example of the adjustment value data 22. The adjustment value data 22 is created in advance for each pattern image prepared in advance.

In the example illustrated in FIG. 9, the adjustment value data 22 includes pattern type number data, expansion height (foaming height) data, area data of the grayscale image to be printed, and density data of the grayscale image to be printed. In the present embodiment, a plurality of the adjustment value data 22 is prepared for each pattern image and is stored in the storage unit 20 (see FIG. 1) in advance.

<Operation of Three-Dimensional Image Forming System>

Figure 10:
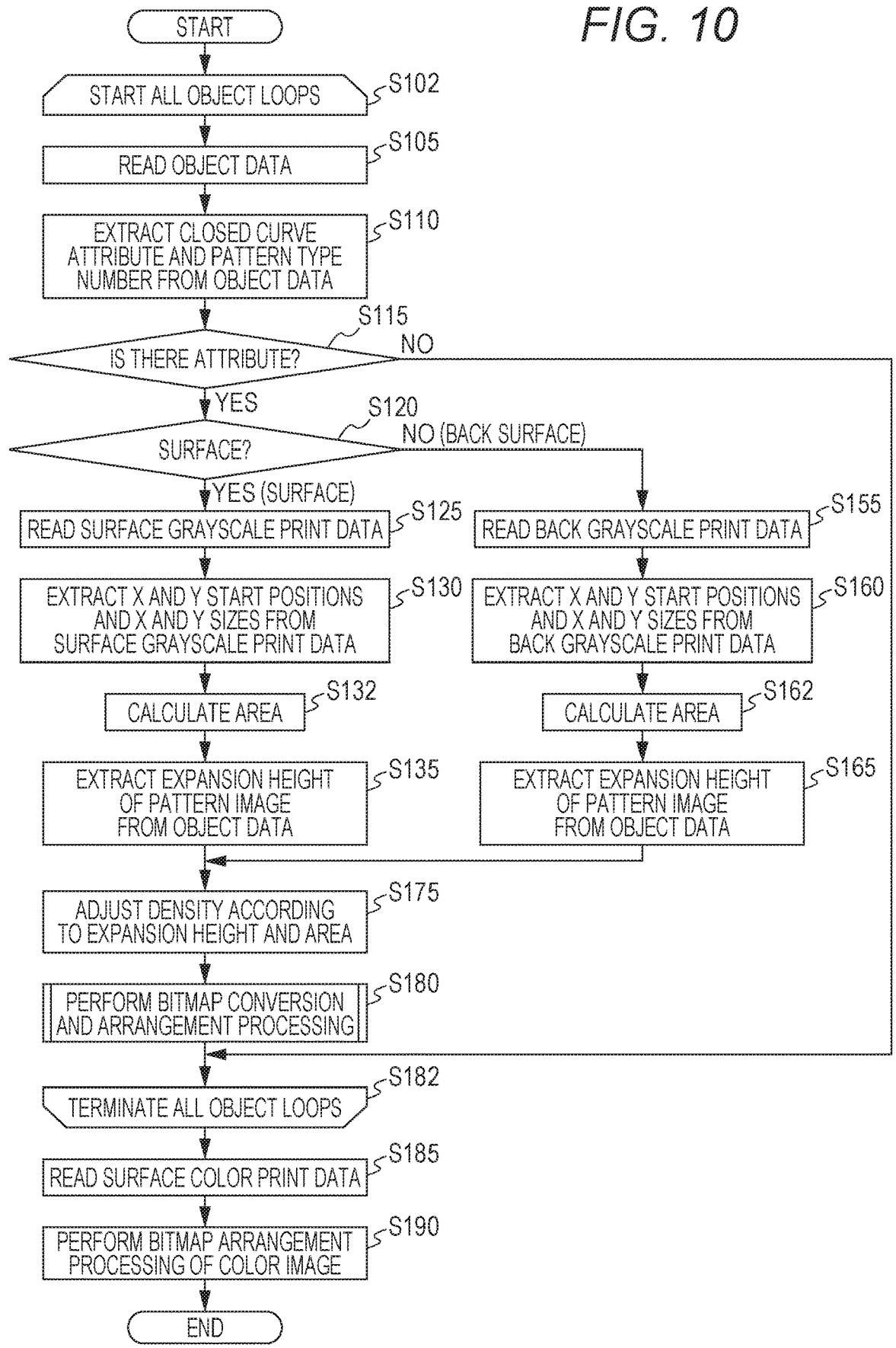
FIG. 10 is a flowchart illustrating an operation of a three-dimensional image forming system according to an embodiment.
Figure 11:
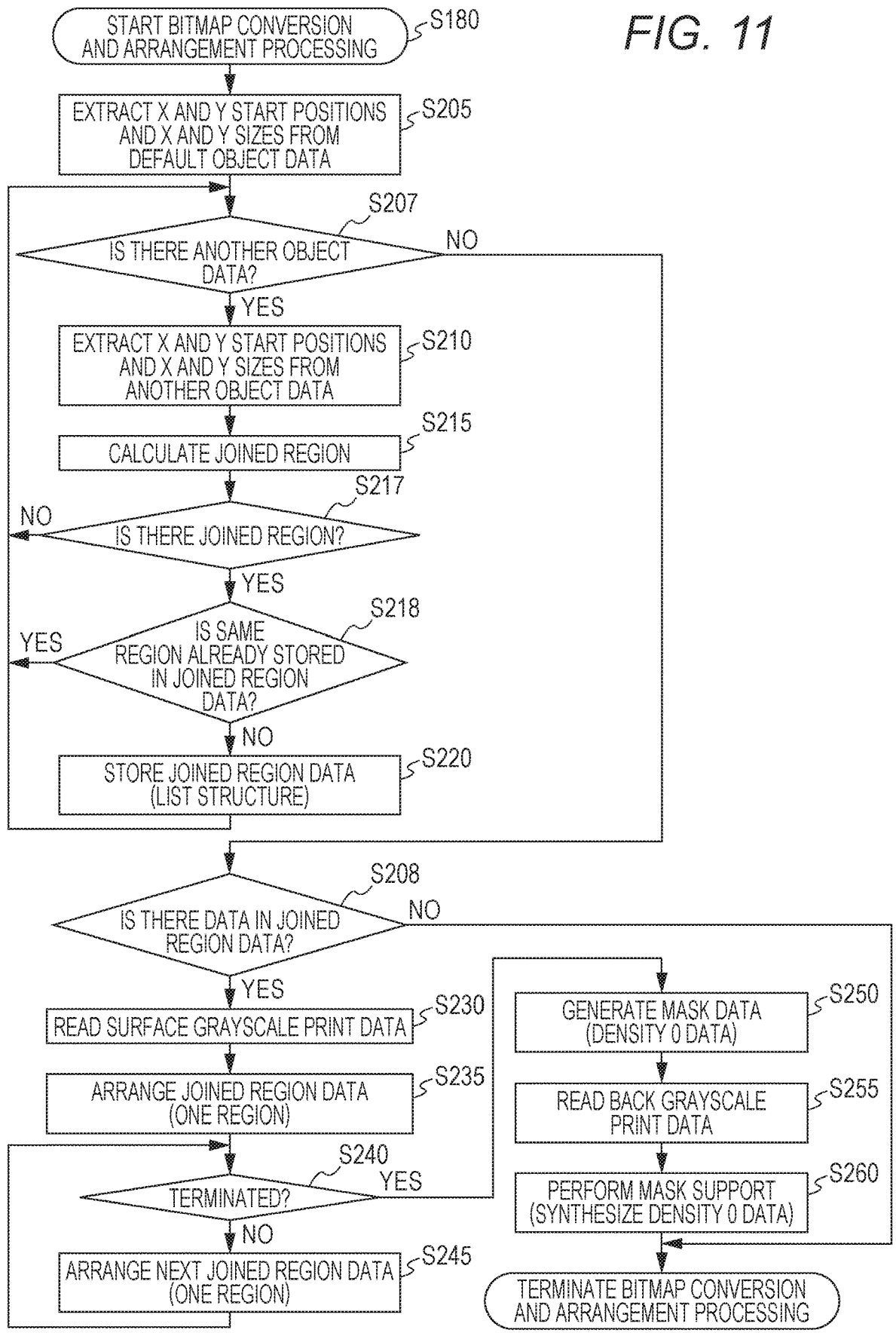
FIG. 11 is a flowchart illustrating an operation of a three-dimensional image forming system according to an embodiment.

Hereinafter, an operation of the three-dimensional image forming system 1 at the time of printing images (the grayscale image and the color image) and at the time of forming the three-dimensional image will be described with reference to FIGS. 10 to 12. FIGS. 10 to 12 are flowcharts illustrating an operation of the three-dimensional image forming system 1. FIGS. 10 and 11 illustrate an operation of the three-dimensional image forming system 1 before forming the three-dimensional image. Further, FIG. 12 illustrates an operation of the three-dimensional image forming system 1 at the time of forming the three-dimensional image. The operation described below is mainly performed by the computer 2 (see FIG. 1).

Here, description will be given assuming that the object data 26 (see FIG. 8A) is stored in the storage unit 20 (see FIG. 1) in advance. Also, the description will be given assuming that the surface color print data 27a, the surface grayscale print data 27b, and the back grayscale print data 27c (see FIG. 2) are created on the basis of the object data 26 (see FIG. 8A) and stored in the storage unit 20 (see FIG. 1).

As illustrated in FIG. 10, before forming the three-dimensional image, the three-dimensional image forming system 1 starts loop processing below for all the object data 26 (step S102). In the loop processing, first, the three-dimensional image forming system 1 reads the object data 26 (see FIGS. 1 and 8A) from the storage unit 20 (step S105), and extracts the closed curve attribute data 26g and the pattern type number data 26h (see FIG. 8A) from the object data 26 (step S110).

Next, the three-dimensional image forming system 1 determines whether there is the closed curve attribute data 26g (that is, whether the closed curve attribute data 26g has been extracted from the object data 26) (step S115). When No is determined (in the case of "No") in the determination of step S115, the processing is terminated. On the other hand, when Yes is determined (in the case of Yes) in the determination of step S115, the three-dimensional image forming system 1 determines whether a plane on which the grayscale image should be printed is the surface, from the pattern type number data 26h (step S120). For example, it is better to print, on the surface, a pattern image with low pixel density or a pattern image in which a three-dimensional image is favorably to be edged. Therefore, in step S120, the three-dimensional image forming system 1 identifies whether the pattern images are images that should be printed on the surface from the pattern type number data 26h, and determines whether a plane on which the grayscale image should be printed is the surface on the basis of the identified information.

When a plane on which the grayscale image should be printed is determined to be the surface in the determination in step S120 (in the case of "Yes"), the three-dimensional image forming system 1 reads the surface grayscale print data 27b (see FIG. 2) from the storage unit 20 (step S125), and extracts the X start position data 26c, the Y start position data 26d, the X size data 26e, and the Y size data 26f (see FIG. 8A) from the surface grayscale print data 27b (step S130). The three-dimensional image forming system 1 then calculates areas of the pattern images on the basis of the extracted X size data 26e and Y size data 26f (step S132).

Next, the three-dimensional image forming system 1 extracts the expansion height (foaming height) data 26i (see FIG. 8A) of the pattern images from the object data 26 (step S135).

Next, the three-dimensional image forming system 1 adjusts the density of the grayscale image on the basis of the adjustment value data 22 (see FIGS. 1 and 9) according to the expansion height and the area of the pattern image in the print regions of the pattern images (step S175). With the processing, an object is reflected in the surface grayscale print data 27b illustrated in FIG. 2.

On the other hand, when a plane on which the grayscale image should be printed is determined to be the back surface in the determination in step S120 (in the case of "No"), the three-dimensional image forming system 1 reads the back grayscale print data 27c (see FIG. 2) from the storage unit 20 (step S155), and extracts the X start position data 26c, the Y start position data 26d, the X size data 26e, and the Y size data 26f (see FIG. 8A) from the back grayscale print data 27c (step S160). The three-dimensional image forming system 1 then calculates areas of the pattern images on the basis of the extracted X size data 26e and Y size data 26f (step S162). Note that the back grayscale print data 27c defines a mirror inverted position with respect to an arranged position of the three-dimensional image formed on the surface of the thermally expandable sheet 40.

Next, the three-dimensional image forming system 1 extracts the expansion height (foaming height) data 26i (see FIG. 8A) of the pattern images from the object data 26 (step S165). After that, the processing proceeds to step S175. As a result, in step S175, the three-dimensional image forming system 1 adjusts the density of the grayscale image on the basis of the adjustment value data 22 (see FIGS. 1 and 9) according to the expansion height and the area of the pattern image in the print regions of the pattern images. With the processing, an object is reflected in the back grayscale print data 27c illustrated in FIG. 2.

After step S175, the three-dimensional image forming system 1 performs bitmap conversion and arrangement processing (step S180). The bitmap conversion and arrangement processing is processing of converting bitmap data that defines an image to be printed. Details of the bitmap conversion and arrangement processing in step S180 will be described with reference to FIG. 11.

Note that, in the example illustrated in FIG. 11, to eliminate the variation in the expansion height in the joined region Rdouble (see FIG. 6C), the three-dimensional image forming system 1 treats the joined region Rdouble as a mask region, synthesizes mask data in which the density is zero, with the mask region of bitmap data indicating the grayscale image to be printed on the surface or the back surface of the thermally expandable sheet 40, and prints the grayscale image on the basis of the bitmap data.

As illustrated in FIG. 11, when the bitmap conversion and arrangement processing in step S180 is started, the three-dimensional image forming system 1 extracts the X start position data 26c, the Y start position data 26d, the X size data 26e, and the Y size data 26f (see FIG. 8A) from default object data 26 (step S205). Here, the "default object data 26" means object data matched with a preset condition.

Next, the three-dimensional image forming system 1 determines whether there is another unprocessed object data 26 (step S207). When Yes is determined (in the case of "Yes") in the determination in step S207, the three-dimensional image forming system 1 extracts the X start position data 26c, the Y start position data 26d, the X size data 26e, and the Y size data 26f (see FIG. 8A) from the another object data 26 (step S210). At this time, when a plane on which the grayscale image corresponding to the another object data 26 is to be printed is the back surface of the thermally expandable sheet 40, the another object data 26 defines the position of the grayscale image such that the grayscale image has a mirror inverted configuration with respect to the three-dimensional image formed on the surface of the thermally expandable sheet 40.

Next, the three-dimensional image forming system 1 determines calculates the joined region Rdouble (see FIG. 6C) of the default object data 26 used in step S205 and the another object data 26 used in step S210 (step S215), and determines whether there is the joined region (step S217).

When the joined region is determined to exist in the determination in step S217 (in the case of "Yes"), the three-dimensional image forming system 1 determines whether data of the same region is already stored in joined region data stored in the storage unit 20 (step S218). The joined region data is data that indicates the position of the calculated joined region Rdouble. When the data of the same region is determined to be already stored in the determination in step S218 (in the case of "Yes"), the processing returns to step S207. On the other hand, when the data of the same region is determined not to be already stored in the determination in step S218 (in the case of "No"), the three-dimensional image forming system 1 stores the joined region data to the storage unit 20 (step S220). The joined region data has a list structure and is added to a list every time the joined region Rdouble is calculated. The joined region Rdouble is a region where the above-described mask support processing is performed. In the present embodiment, the three-dimensional image forming system 1 performs the above-described mask support processing in processing of step S250 to S260 described below.

On the other hand, when the joined region is determined not to exist in the determination in step S217 (in the case of "No"), the processing returns to step S207.

When No is determined in step S207 (in the case of "No"), the three-dimensional image forming system 1 determines whether there is data in the joined region data (step S208). When No is determined (in the case of "No") in the determination of step S208, the bitmap conversion and arrangement processing in step S180 is terminated. On the other hand, when Yes is determined (in the case of "Yes") in the determination of step S208, the three-dimensional image forming system 1 reads the surface grayscale print data 27*b* (see FIG. 2) from the storage unit 20 (step S230), and arranges the joined region data of one region on the surface grayscale print data 27*b* (step S235).

Next, the three-dimensional image forming system 1 determines whether the processing is terminated (step S240). When the processing is determined not to be terminated in the determination in step S240 (in the case of "No"), the three-dimensional image forming system 1 arranges the next joined region data of one region on the surface grayscale print data 27*b* (step S245). After that, the processing proceeds to step S240. On the other hand, when the processing is determined to be terminated in the determination in step S240 (in the case of "Yes"), the three-dimensional image forming system 1 generates mask data in which the density is zero (step S250), and reads the back grayscale print data 27*c* (see FIG. 2) from the storage unit 20 (step S255). The back grayscale print data 27*c* (see FIG. 2) defines the position of the grayscale image such that the grayscale image has a mirror inverted configuration with respect to the three-dimensional image formed on the surface of the thermally expandable sheet 40. After step S255, the three-dimensional image forming system 1 synthesizes the mask data in which the density is zero with the back grayscale print data 27*c* to perform the mask support processing (step S260). With the processing, the grayscale image OBAshade illustrated in FIG. 6B and the grayscale image OBB shade illustrated in FIG. 6C become printable.

The bitmap conversion and arrangement processing in step S180 is terminated.

Referring back to FIG. 10, after step S180, when No is determined in the determination in step S115 (in the case of "No"), the processing proceeds to step S182. Then, in step S182, the series of loop processing on and after step S102 is terminated.

After step S182, the three-dimensional image forming system 1 reads the surface color print data 27*a* (see FIG. 2) from the storage unit 20 (step S185), and performs bitmap arrangement processing of a color image (that is, processing of arranging pixels that configure the color image on a bitmap) on the basis of the surface color print data 27*a* (step S190). As a result, the bitmap data that configures the grayscale image OBAshade and the grayscale image OBB shade illustrated in FIG. 6A is created.

The processing before forming the three-dimensional image illustrated in FIGS. 10 and 11 is terminated.

After that, the processing at the time of forming the three-dimensional image illustrated in FIG. 12 is performed.

As illustrated in FIG. 12, at the time of forming the three-dimensional image, the computer 2 of the three-dimensional image forming system 1 first outputs bitmap data of the grayscale image (here, the grayscale image OBAshade illustrated in FIG. 6B) for surface print to the printer 5, and prints the grayscale image on the surface of the thermally expandable sheet 40 (step S305).

Next, the computer 2 of the three-dimensional image forming system 1 outputs bitmap data of the grayscale image (here, the grayscale image OBBshade illustrated in FIG. 6C) for back surface print to the printer 5, and prints the grayscale image on the back surface of the thermally expandable sheet 40 (step S310).

Next, the computer 2 of the three-dimensional image forming system 1 outputs bitmap data of the color images (here, the color images OBAcolor and OBBcolor illustrated in FIG. 6C) to the printer 5, and prints the color images on the surface of the thermally expandable sheet 40 (step S315). With the processing, the thermally expandable sheet 40 becomes in the state illustrated in FIG. 7A.

After that, the user installs the thermally expandable sheet 40 with the surface up to the light irradiation unit 6 (step S320). Then, the light irradiation unit 6 irradiates the surface of the thermally expandable sheet 40 with light to cause the region where the grayscale image is printed on the surface to partially expand (step S325). That is, the light irradiation unit 6 forms the three-dimensional image based on the grayscale image printed on the surface. With the processing, the thermally expandable sheet 40 becomes in the state illustrated in FIG. 7B. As a result, only the three-dimensional image OBA of the object A illustrated in FIG. 6A is formed on the surface of the thermally expandable sheet 40.

After that, the user installs the thermally expandable sheet 40 with the back surface up to the light irradiation unit 6 (step S330). Then, the light irradiation unit 6 irradiates the back surface of the thermally expandable sheet 40 with light to cause the region where the grayscale image is printed on the back surface to partially expand (step S335). That is, the light irradiation unit 6 forms the three-dimensional image based on the grayscale image printed on the back surface. With the processing, the thermally expandable sheet 40 becomes in the state illustrated in FIG. 7C. As a result, as illustrated in FIG. 6A, the three-dimensional image OBB of the object B is formed on the surface of the thermally expandable sheet 40 in addition to the three-dimensional image OBA of the object A.

The processing at the time of forming the three-dimensional image illustrated in FIG. 12 is terminated.

<Principal Characteristics of Three-Dimensional Image Forming System>

The three-dimensional image forming system 1 has following characteristics.

(1) The three-dimensional image forming system 1 includes the density adjustment unit 12. The density adjustment unit 12 adjusts, for the print data 27, the density of the grayscale image according to types of pattern images in print regions of the pattern images such that expansion heights of the print regions of the pattern images included in the grayscale image become desired heights (to be specific, a height specified by a user for each pattern image).

Such a three-dimensional image forming system 1 can cause the expansion heights of the print regions of the pattern images to be favorable heights.

Note that a three-dimensional structure including the three-dimensional image formed by the three-dimensional image forming system 1 has a following configuration.

That is, the three-dimensional structure has the grayscale image printed, which is used to cause a desired region of the thermally expandable sheet 40 to thermally expand, and the three-dimensional image formed in the print region where the grayscale image is printed. A plurality of types of pattern images is included in the grayscale image. Then, even between print regions having the same expansion height of the three-dimensional images, the print regions may have the grayscale image having different density according to the type of the pattern image.

(2) The density adjustment unit 12 adjusts the density of the grayscale image, of a print region of a closed curve included in the grayscale image and a print region of a pattern image arranged inside the closed curve (see FIG. 2).

Such a three-dimensional image forming system 1 can adjust the density of the grayscale image for each pattern image surrounded by the closed curve.

(3) The density adjustment unit 12 adjusts the density of the grayscale image on the basis of the adjustment value data 22 stored in the storage unit 20 in advance.

Such a three-dimensional image forming system 1 can adjust the density of the grayscale image to a definitive value in a short time on the basis of the adjustment value data 22. Further, the three-dimensional image forming system 1 can support various types of pattern images by updating the adjustment value data 22 according to the operation.

(4) The density adjustment unit 12 defines the density of the grayscale image corresponding to an expansion height and an area of the print region of the pattern image, for each type of the pattern image included in the grayscale image, by using the adjustment value data 22 (see FIG. 9).

Such a three-dimensional image forming system 1 can adjust the density of the grayscale image according to the area of the print region.

(5) The three-dimensional image forming system 1 includes the sorting unit 13. The sorting unit 13 sorts, for print data 27, pattern images included in the grayscale image into a pattern image to be printed on a surface of the thermally expandable sheet 40 and a pattern image to be printed on a back surface on the basis of a type of the pattern image for each pattern image.

Such a three-dimensional image forming system 1 can defines a plane on which the grayscale image is to be printed, of the thermally expandable sheet 40, on the basis of the type of the pattern image. With the process, the three-dimensional image forming system 1 can form a three-dimensional image having a favorable expansion height. Therefore, the three-dimensional image forming system 1 can suppress occurrence of variation in the expansion height of the three-dimensional image. Further, the three-dimensional image forming system 1 can sufficiently edge the three-dimensional image, which is favorably to be edged.

(6) The sorting unit 13 favorably has a configuration to have the joined region Rdouble (see FIG. 6C) where an image to be printed on the surface of the thermally expandable sheet 40 and an image to be printed on the back surface are joined, of the print region where the grayscale image is to be printed, as a mask region, and to synthesize mask data in which density is zero, with the mask region of bitmap data that indicates the image to be printed on the surface or the back surface of the thermally expandable sheet 40 (see step S260 in FIG. 11).

Such a three-dimensional image forming system 1 can suppress generation of overexpansion (a phenomenon in which expansion advances exceeding a desired height) due to generation of an excess heat quantity as a result of too high pixel density of the grayscale image in the joined region Rdouble (see FIG. 6C).

Note that the three-dimensional structure including the three-dimensional image formed by the three-dimensional image forming system 1 has a following configuration.

That is, the three-dimensional structure has the grayscale image printed on the surface and the back surface of the thermally expandable sheet 40, the grayscale image being used to cause a desired region of the thermally expandable sheet 40 to thermally expand, and the three-dimensional image formed in the print region where the grayscale image is printed. Then, the grayscale image printed on either the surface or the back surface has gone in the joined region Rdouble (see FIG. 6C) where the grayscale image printed on the surface and the grayscale image printed on the back surface are joined.

As described above, the three-dimensional image forming system 1 according to the present embodiment can cause the expansion heights of the print regions of the pattern images to be favorable heights.

Note that the present invention is not limited to the above-described embodiments and various changes and modifications can be made without departing from the gist of the present invention.

For example, the above-described embodiments have been made in detail for easy understanding of the gist of the present invention. Therefore, the present invention is not necessarily limited to one including all the described configuration elements. Further, the present invention allows addition of a certain configuration element to another configuration element or change of a part of a configuration element to another configuration element. Further, the present invention allows deletion of a part of a configuration element.

Further, for example, in the above-described embodiments, the description has been given assuming that the density adjustment unit 12 is provided in the computer (print data creation device) 2. However, the density adjustment unit 12 may be provided in the printer 5. Further, the printer 5 may be integrally configured with the light irradiation unit 6.

Further, for example, the sorting unit 13 may sort the pattern images as follows. That is, first, the sorting unit 13 calculates, for the grayscale image indicated by the print data 27, pixel density per region, on the basis of the pixel density of the pattern images included in the grayscale image and a calculation result of the number of regions by edge detection processing. The pixel density per region indicates whether the pattern image is a fine pattern or a rough pattern. Next, the sorting unit 13 determines whether the calculated pixel density per region exceeds a predetermined threshold. The sorting unit 13 then may sort the pattern images in such a manner that the pattern image in which the pixel density per region exceeds the threshold (the pattern image having higher pixel density per region than the threshold) is to be printed on the back surface of the thermally expandable sheet 40, and the pattern image in which the pixel density per region does not exceed the threshold (the pattern image having lower pixel density per region than the threshold) is to be printed on the surface of the thermally expandable sheet 40.

The invention claimed is:

1. A three-dimensional image forming system comprising:
a processor configured to adjust, for print data for printing a grayscale image used to cause a predetermined region of a thermally expandable sheet to thermally expand, a density of the grayscale image according to types of pattern images included in the grayscale image, in print regions of the pattern images such that expansion heights of the print regions of the pattern images become desired heights,
wherein the processor defines the density of the grayscale image corresponding to the expansion height and an area of the print regions of the pattern images, for each type of the pattern images included in the grayscale image, and
wherein the processor is configured to, in a case where a plurality of the print regions included in the grayscale image are overlapped with each other, adjust the density of an overlapping region in which the plurality of the print regions are overlapped with each other to be zero.

2. The three-dimensional image forming system according to claim 1, wherein the processor adjusts the density of the grayscale image in a print region of a closed curve included in the grayscale image and a print region of a pattern image arranged inside the closed curve.

3. The three-dimensional image forming system according to claim 1, wherein the print data comprises bitmap data.

4. The three-dimensional image forming system according to claim 1, wherein the pattern images include at least one of a stripe pattern and a dot pattern.

5. The three-dimensional image forming system according to claim 4, wherein the pattern images include at least one of stripe patterns and dot patterns having different sizes.

6. The three-dimensional image forming system according to claim 1, wherein the processor is configured to:
generate synthesized print data by synthesizing mask data, in which the density is zero, with the print data at the overlapping region in the grayscale image to be printed onto a surface of the thermally expandable sheet; and
cause a printer to print the grayscale image based on the synthesized print data.

7. The three-dimensional image forming system according to claim 6, wherein the surface is a surface of a base material which is a component of the thermally expandable sheet.

8. The three-dimensional image forming system according to claim 6, wherein the surface is a surface of a thermal expansion layer which is a component of the thermally expandable sheet.

9. A three-dimensional image forming method comprising:
adjusting, for print data for printing a grayscale image used to cause a predetermined region of a thermally expandable sheet to thermally expand, a density of the grayscale image according to types of pattern images included in the grayscale image, in print regions of the pattern images such that expansion heights of the print regions of the pattern images become desired heights,
wherein the adjusting comprises defining the density of the grayscale image corresponding to the expansion height and an area of the print regions of the pattern images, for each type of the pattern images included in the grayscale image, and
wherein the adjusting comprises, in a case where a plurality of the print regions included in the grayscale image are overlapped with each other, adjusting the density of an overlapping region in which the plurality of the print regions are overlapped with each other to be zero.

10. A non-transitory computer-readable storage medium having a program stored thereon, the program being executable by a processor of a three-dimensional image forming system to control the processor to perform processes comprising:
adjusting, for print data for printing a grayscale image used to cause a predetermined region of a thermally expandable sheet to thermally expand, a density of the grayscale image according to types of pattern images included in the grayscale image, in print regions of the pattern images such that expansion heights of the print regions of the pattern images become desired heights,
wherein the adjusting comprises defining the density of the grayscale image corresponding to the expansion height and an area of the print regions of the pattern images, for each type of the pattern images included in the grayscale image, and
wherein the adjusting comprises, in a case where a plurality of the print regions included in the grayscale image are overlapped with each other, adjusting the density of an overlapping region in which the plurality of the print regions are overlapped with each other to be zero.

* * * * *